United States Patent [19]

Veiga et al.

[11] 4,259,384

[45] * Mar. 31, 1981

[54] IMITATION-LEATHER MATERIAL AND METHOD OF PREPARING SUCH MATERIAL

[75] Inventors: Manuel J. Veiga, Lowell; Richard E. Petersen, Concord, both of Mass.

[73] Assignee: Compo Industries, Inc., Waltham, Mass. ; a part interest

[*] Notice: The portion of the term of this patent subsequent to Sep. 23, 1997, has been disclaimed.

[21] Appl. No.: 75,901

[22] Filed: Sep. 17, 1979

Related U.S. Application Data

[63] Continuation-in-part of Ser. No. 907,974, May 22, 1978.

[51] Int. Cl.³ .......................... B32B 5/18; B32B 3/00
[52] U.S. Cl. .......................... 428/97; 156/78; 156/246; 156/247; 156/289; 156/331; 156/344; 264/45.1; 264/50; 428/91; 428/95; 428/96; 428/310; 428/315; 428/904; 521/69

[58] Field of Search .................. 156/77, 78, 79, 246, 156/247, 331, 334, 344, 289; 264/41, 45.1, 50; 428/310, 315, 904, 91, 95, 96, 97; 521/69, 70, 71

[56] References Cited

U.S. PATENT DOCUMENTS

| | | | |
|---|---|---|---|
| 3,860,680 | 1/1975 | Warwicker et al. | 264/41 |
| 4,002,792 | 1/1977 | Petersen et al. | 428/310 |

Primary Examiner—William A. Powell
Assistant Examiner—Robert A. Dawson
Attorney, Agent, or Firm—Richard P. Crowley

[57] ABSTRACT

An imitation-leather sheet laminate material is prepared employing an acidic, heat-coagulated, cross-linkable, elastomeric, latex polymer, wherein the acidic latex polymer is coated onto a top, resin, skin layer and a fibrous base sheet is placed on the wet foam layer, which method comprises: shock-heating the wet foam layer to coagulate and cross-link the polymer therein into a fine, open-cell, tough, foam layer and to remove rapidly water from the coagulated foam layer.

21 Claims, No Drawings

IMITATION-LEATHER MATERIAL AND METHOD OF PREPARING SUCH MATERIAL

REFERENCE TO PRIOR APPLICATION

This application is a continuation-in-part of U.S. patent application Ser. No. 907,974, filed May 22, 1978, hereby incorporated by reference.

BACKGROUND OF THE INVENTION

Foamable latex formulations have been employed in the preparation of laminate sheet materials suitable for use as imitation-leather products; for example, for the production of shoes, handbags, clothing and the like. One method employed is known as the "wet-gap lamination technique" and is described in particular with specific formulations and techniques in connection with U.S. Pat. No. 4,002,792, issued Jan. 11, 1977, hereby incorporated by reference in its entirety. In this technique, a polymer skin layer is formed, such as by casting a polymer solution onto an embossed release sheet, and, thereafter, mechanically foaming a latex and coating a layer of wet foam onto the embossed skin layer. Prior to drying, a base sheet material, such as a fibrous sheet material, napped or unnapped, is placed on top of the wet foam layer. The wet-foam-coated paper at the bottom is then brought into contact with a base fabric sheet at the top through a pair of rolls or bars with a predetermined nip to form a laminate. Thereafter, the wet-gap laminate material so formed is dried in an oven to remove water from the foam layer and then subsequently is heated in another oven to cross-link or cure the dried latex foam polymer.

In another embodiment, using a post-adhesive laminate process, the wet foamable latex layer on the skin layer is first dried, and then an adhesive tie-in layer; for example, 1 to 20 wet mils and less than the foam layer, is coated onto the top of the dried latex layer. Thereafter, the base sheet material, such as the fabric, is placed on the wet adhesive layer and the laminate sheet material then is heated to cure or cross-link the latex layer. This post-adhesive laminate process avoids the difficulties of evaporating a large amount of water out of the wet foam layer in the laminate, but involves a separate adhesive-coating operation and oven. The laminate formed is often run through a set of bars or rolls to press down with considerable force the fabric base into the adhesive layer before heating to cure the foam layer.

In producing such laminate sheet material, care must be taken as regards the production speeds employed and the degree of heating at various stages, in order to avoid blistering of the laminate material by too rapid heating to remove the water and trapping of the moisture vapor within the internal portion of the laminate. Thus, the wet-gap lamination technique, while satisfactory in many respects, typically requires limited production speeds in order to avoid rapid heating and also requires the capital expense and need for two separate oven systems: one a drying oven system and the other a curing or cross-linking oven system. The post-adhesive laminate process involves the use of an adhesive and a separate oven and casting process.

Therefore, it is desirable to overcome the disadvantages in the wet-gap lamination system and post-adhesive laminate process and to provide new and improved sheet laminate materials.

SUMMARY OF THE INVENTION

Our invention concerns improved latex-foam-coated and laminate materials, particularly flexible sheet laminate materials, suitable for use as imitation-leather materials or for use in preparing such materials, and to a method of preparing such coated and laminate sheet materials. More particularly, our invention relates to an improved imitation-leather material containing a latex-foam core layer derived from a foamable polymeric latex, and to the method of preparing such improved imitation-leather material.

Our method comprises an improvement over the wet-gap lamination technique, wherein the polymeric wet foam layer is a heat-coagulable, foamable, latex layer, and wherein the improvement comprises the step of coagulating the polymeric material from the wet foam layer after formation of the foam-coated or laminate sheet material, to provide a foam layer of heat-coagulated polymer characterized by a high density typically, but not necessarily, over 40 pounds per cubic foot (pcf); for example, over 50 pcf, and having a fine-cell structure. The coagulated foam layer permits the subsequent and rapid heating of the sheet material and the easy and effective removal of water therefrom, without blistering of the product.

Our method permits the preparation of the entire sheet laminate; that is, with the polymeric skin layer or imitation embossed-leather design layer composed of, for example, vinyl-chloride or urethane-elastomer resin, and of the employment of a base sheet layer, such as a fibrous layer like a woven or nonwoven fibrous natural or synthetic material, with one or more intervening latex foam layers.

We have found that both the wet-gap lamination process and the post-adhesive lamination process are improved considerably by the employment of a heat-coagulable, foamable, latex layer. The employment of a rapidly coagulable wet foam layer provides for a fine, tough, dense, fast-drying and fast-curing foam layer. Heat-coagulation of the foam in the wet-gap lamination process provides significant improvement, since the rapid heat-shock coagulation of the wet foam layer; for example, at temperatures of 375° F. or less, permits the easy and rapid removal of the water from the coagulated foam, without the danger of blistering with high oven temperatures or slow production-line speeds. Our process also is useful in the post-adhesive lamination process, since the rapid and easy removal of water from the wet foam layer permits the adhesive tie-in layer to be applied and dried more quickly. Since the coagulated foam layer employed, unlike the carpet or mattress field, is relatively thin; for example, less than about 50 mils dry, the problems of curling associated with thick, coagulated, latex foam layers are avoided or minimized.

In our preferred method, a heat-coagulable, foamable, latex composition is employed, wherein a natural or synthetic elastomeric/polymeric foam composition is heat-coagulable. The polymeric latex preferably is heat-coagulable by the addition of an acid or acid salt to place the foam latex at a pH of less than about 5.0, such as 4.0, and more particularly at a pH of less than 3.0; for example, 2.0 to 3.0, so that the heat-coagulating temperature preferably is about 325° F. to 350° F.; for example, 275° F. to 350° F. The gel points of our coagulable latex foam typically is adjusted to be about 120° F.; for example, 100° F. to 140° F. or 110° F. to 115° F. Shock-heating of the coagulable latex should be at an oven temperature of less than 450° F. to coagulate the latex and to remove water and effect polymer cure. The acidic latex formulation does not have a long pot life; for example, often less than 8 hours, but ammonia may be added to raise the pH and extend the pot life as desired, or additives used to adjust the pot life. The foamable latex may be made heat-sensitive or -coagulable by acids or other additives, or combinations thereof; however, the use of acids, due to cost and simplicity, is preferred. For example, a sufficient amount of heat-coagulable material for the polymer, such as a functional polysiloxane or siloxane copolymer, such as copolymer of methylsiloxane and dimethylsiloxane and hydroxyalkyl polyols, may be used.

The foamable latex formulation is maintained on the acidic side, and particularly is maintained on the acidic side with the use of an acid or acid salt, such as a strong acid like paratoluene sulfonic acid; however, if desired, other acids like sodium silicafluoride, tartaric acid, citric acid, acetic acid, formic acid, oxalic acid and their salts or combinations may be used.

Such acidic, heat-coagulable, mechanically foamable latex formulations permit the coagulation of the polymer from the wet foam latex layer on heating, with the subsequent result that water may be removed easily and quickly from the coagulated latex layer by rapid heating through the substantially open-cell fine structure of the coagulated foam layer. Our method avoids the employment of separate drying and curing ovens, and also permits the very rapid production-line speeds in the production of sheet laminate materials, since the material may be heated rapidly without danger of blistering, due to the rapid removal of water. Our method permits the elimination or makes optional the use of adhesive tie-coat layers, particularly when the wet foam laminate layer is placed on the napped side of a nap sheet fabric, such as where a fabric is to be employed as a shoe-upper material. Where an adhesive layer is placed thereon, the adhesive tie-coat layer tends to be wicked up, leaving an adhesive-starved interface. In the wet-gap lamination process, the napped fibers of the napped side wick up the water from the dense and much higher gauze, wet foam layer and permit even, rapid removal of the water from the wet foam layer with the use of napped-base fabrics.

Our improved method provides for a coagulation of the elastomeric latex polymer from a wet foam layer in a controlled manner, typically by the employment of heat and the use of an acidic latex, to provide a different type of coagulated foam with a fine substructure of high density and a substantially open-cell character, which permit the rapid and easy removal of water, while maintaining the preparation of a very flexible and desirable imitation-leather material suitable for use, for example, as shoe uppers.

In our method, the polymer of the foamable latex layer may be coagulated by a number of techniques. However, our preferred embodiment is to coagulate the foam by maintaining the foam as strongly acidic by the use of paratoluene sulfonic acid or acid salt or a similarly strong acid and, optionally, if desired, also by employing a heat-sensitizing agent which reduces the gel or heat-coagulation temperature of the foam, such as a siloxane-type compound.

The sheet laminate material of our invention may comprise a top polymeric skin layer which may or may not be embossed with a grain or other surface design pattern thereon, one or more layers of coagulated-foam-flexible latex, and a base layer, typically a woven or nonwoven fibrous base sheet, such as a napped cotton fabric. Adhesive tie layers may be employed if desired, but are not necessary. In addition, our method permits the preparation of the wet foam layer directly on the napped side of a napped base fabric at commercially acceptable speeds; for example, over 200 yards per hour.

In an even broader connotation, our coagulated foam layer may be used to prepare a laminate material consisting of a base sheet and a coagulated dried and cured foam layer of various densities thereon; that is, a laminate material without the necessity of a solid skin layer of a vinyl-chloride or urethane or other resin. For example, such a sheet material may be prepared by foaming an acidic, heat-coagulable, polymeric latex and coating the foamable layer onto an embossed paper-release sheet; for example, 5 to 100 mils, and then placing a wet-gap lamination base sheet; for example, a napped fabric, onto the wet foam layer and rapidly heating the wet laminate structure; for example, from 250° F. to 375° F.; for example, 250° F. to 275° F., to coagulate the polymer and to remove water, and, thereafter, stripping off the release sheet, to provide a dry laminate product having the base layer securely and directly adhered to a dry, coagulated, fine, dense foam layer which may have a surface-design effect thereon from the embossed release paper. The coagulated polymer foam layer, with the fine, tough, dense cell structure, often presents a fine-grain, imitation-like surface without the need for employing a skin or other top-coating layers. Our invention not only avoids the difficulties associated with prior foamable latices employed in preparing imitation-leather materials, but also avoids the difficulties associated with the use of organic-solution urethanes and the coagulation of urethane from organic solutions; for example, by employing a water bath, which requires such coagulated urethanes to be heated subsequently to remove the water of coagulation.

A wide variety of polymers may be employed in the foamable polymeric latex compositions employed in our method and material. However, such polymers typically should be such as to be stable or relatively stable and on the acid side, and may comprise, but not be limited to, synthetic elastomers of nitrile- or diene-conjugated elastomers or copolymers or terpolymers containing such diene and nitrile compounds. Such elastomers include, for example, acrylonitrile-butadiene copolymers and carboxylated elastomers, such as to cure with the use of aminoplast resins, such as melamine-formaldehyde resins. Suitable elastomers include acrylonitrile-diene-acrylic terpolymers, such as acrylonitrile-butadiene-acrylic polymers.

Heat-coagulable, foamable latex formulation for use in our method comprise an aqueous latex with a synthetic elastomer, optionally the addition of minor amounts; for example, 5% to 30% by weight, of other compatible polymers with vinyl-halide resin, such as polyvinyl-chloride and vinyl-chloride/vinyl-acetate copolymers, to modify the elastomer properties, such as to provide better hand and suppleness to the foam; surfactants; for example, 0.1% to 5% by weight, to stabilize the foam and permit mechanical frothing, a curing or cross-linking agent; for example, 0.5% to 20% by weight; viscosity-control agents; fillers, such as clay, alumina, diatomaceous earth and the like; pigments; dyes; stabilizers; flame retardants; plasticizers; heat-sensitizing agents and the like.

The foamable latex formulations useful in our invention also may include thermoplastic polymers, but preferably cross-linkable synthetic polymers, such as polyurethanes; vinyl halides like polyvinyl-chloride resin and copolymers of vinyl-chloride resins; acrylic resin; and other polymers provided in latex formulations suitable for mechanical frothing and which form flexible, abrasion-resistant, coagulated foam layers. These latex polymers may be modified with other resins or used alone or in combination, and particularly may be used in combination with carboxylated-nitrile-diene elastomers to reduce the formulation cost.

In particular, it has been discovered that cross-linkable, elastomeric, polyurethane, latex compositions (aliphatic or aromatic polyethers or polyesters) may be employed usefully alone to form coagulated, flexible, polyurethane foam layers or in combination; for example, 10% to 70%, with acrylonitrile-butadiene copolymers.

The polyurethane formulation typically includes the polyurethane polymer; a cross-linking agent, such as an amine, but preferably a cross-linking amount of a melamine-formaldehyde resin (1 to 20 phr); an acid or acid salt; a heat-sensitizing agent to adjust the coagulation temperature; and optionally fillers and surfactants. The heat-sensitizing agents and surfactants are used to adjust the heat-sensitizing temperature and to raise the coagulation point or pot life of the formulation. The latex formulation should be stable enough to be frothed mechanically and applied and for coagulation to occur with the shock-heating of the wet foam layer. The shock-heating should be conducted in a single heating operation, such as with a single oven. The wet foam layer first coagulates (e.g., at 100° F. to 140° F.), then water is rapidly removed by the heat through the open-cell coagulated foam, and, at the same time or thereafter, cross-linking of the coagulated dried or partially dried foam occurs (e.g., at 250° F. to 300° F.).

The amount of the acid or acid salt may vary, depending on the gel point and pH desired, but often ranges from about 0.5% to 3% by weight. The foamable latex should be frothed, such as by mechanical means, after preparation and cast onto the paper or other release sheet, without or with a thin polymeric skin layer (for example, 0.1 to 5 mils thick). The coated sheet or laminate, if a base fabric is used on the top, is introduced into a hot-air or steam oven at 350° F. to 375° F., wherein the heat shock coagulates the latex foam and drives off the water. After drying, the foam is cured by heating; for example, 375° F. to 425° F.; for example, 250° F. to 300° F., in the same oven or in a single-stage heating operation. The procedure employed is as described in U.S. Pat. No. 4,002,792.

DESCRIPTION OF THE EMBODIMENTS

Example 1

A foamable latex formulation was prepared by admixing the following components:

| Ingredients | | Total Solids | Wet | phr (parts per hundred parts of resin) |
|---|---|---|---|---|
| 1. | Hycar 1572 × 45, a carboxylated acrylonitrile-butadiene emulsion copolymer of B.F. Goodrich Co. | 47% | 96.0 | 94.8 |
| 2. | Vinyl-chloride polymer - modifier | 50% | 5.0 | 5.2 |
| 3. | Curing agent - methylated melamine-formaldehyde resin (Cymel 303 of American Cyanamid Co.) | 85% | 4.0 | 7.1 |
| 4. | Surfactant - sodium lauryl sulfate | 3.0% | 0.5 | 0.3 |
| 5. | Paratoluene sulfonic acid monohydrate | 100% | 8.5 | 1.7 |
| 6. | Alumina hydrate flame retardant - filler | 100% | 8.5 | 17.8 |
| 7. | Thickening agent - methyl cellulose | 100% | 0.5 | 1.1 |

The latex formulation so prepared had a viscosity of 5,000 to 10,000 cps, Brookfield spindle #4 rpm 20, a specific gravity of 1.094 and a pH of 2.0. The gel point of the latex was 110° F. to 120° F. The latex was foamed mechanically and a wet foam layer of 18 to 30 mils; for example, 25 mils (16 mils dry), was coated onto the surface of a thin, elastomeric, urethane, skin layer, 0.3 to 0.8 mils previously cast onto an embossed release paper. A napped cotton base fabric, with the napped side down, was placed on the wet foam layer and the wet laminate formed was passed through a pair of nip rollers. The laminate was then heated in a steam-heated oven to 350° F. to coagulate the nitrile-diene coagulated polymer by shock-heating and to drive off the water from the dense, fine, open-cell foam formed by such shock-heating. Heating is continued in the same oven to cure the coagulated foam. The laminate recovered had good hand, was supple and tough, with a foam layer density of 50 to 60 pcf; for example, 58 pcf. The same noncoagulable formulation, without the addition of paratoluene sulfonic acid or with only minor amounts and having a slightly acidic pH; for example, of 6.0 to 6.5, in the same process, provided unsatisfactory laminates. The introduction of the wet laminate into the 350° F. oven resulted in a poor, weak, large-cell, inner-foam, cure composition and illustrated unsatisfactory laminates.

Example 2

The procedure set forth in Example 1 was repeated in a similar formulation, except that the foamable latex formulation substituted an elastomeric, aliphatic, polyester, polyurethane latex for the Hycar 1572, and the surfactant and thickening agent were omitted and the pH was adjusted with the acid to about 4.0 or less.

Example 3

The procedure of Example 1 was repeated to produce a high-density, coagulated, polyurethane foam layer, wherein the latex formulation used was prepared by admixing the following components:

| Ingredients | | Total Solids | Wet |
|---|---|---|---|
| 1. | Hooker elastomeric polyurethane latex 2020L of Hooker Chemical and Plastic Corp. | 65% | 154.0 |
| 2. | Cross-linking agent - melamine-formaldehyde resin (Cymel 373 of American Cyanamid Co.) | 85% | 4.0 |
| 3. | Paratoluene sulfonic acid | 33% | 3.0 |

-continued

| Ingredients | | Total Solids | Wet |
|---|---|---|---|
| 4. | Polysilicone - heat-sensitizing agent | 100% | 2.0 |
| 5. | Surfactant - soap - Emulsion W of Verona Co. | 5% | 1.0 |
| | pH of final formulation | 4.0 | |

Our invention has been described particularly in its preferred embodiment as an improvement on the wet-gap lamination method. However, it is recognized and is a part of our invention that heat-coagulable elastomeric foams in thin layers may be used as an inner-core foam with leather substitutes, or as the embossed or nonembossed surface layer on a base sheet; that is, where the fine, dense, heat-coagulated foam forms the leather-substitute surface.

What we claim is:

1. In a method of preparing an imitation-leather sheet material, which method comprises:
    (a) coating a thin wet foam layer of a foam latex composition onto a sheet material, the latex composition comprising a foamable, film-forming, elastomeric, cross-linkable polymer and a cross-linking agent for the polymer;
    (b) placing a fibrous base sheet material onto the top surface of the wet foam latex layer to provide a wet laminate product; and
    (c) heating the wet laminate product to dry and cure the foam layer and to provide a dry laminate product, the improvement which comprises
        (i) providing a heat-coagulable, polymeric, acidic, latex foam composition as the wet foam layer, wherein the latex composition includes an acid or an acid salt to reduce the pH to less than 5.0, and
        (ii) shock-heating the wet foam layer of the wet laminate product by heating rapidly the wet foam layer in a single heating operation to a temperature of not greater than 450° F. and greater than about 250° F., to heat-coagulate the polymer to a fine, dense, open-cell, foam structure to remove water from the coagulated foam layer and to cross-link the polymer.

2. The method of claim 1 wherein the polymer has a coagulation temperature of from about 140° F. or less.

3. The method of claim 1 wherein the latex composition has a pH of from about 2.0 to 5.0.

4. The method of claim 1 wherein the latex composition includes a paratoluene sulfonic acid or acid salt to reduce the pH to a pH of from about 2.0 to 4.0.

5. The method of claim 1 wherein the latex composition includes a heat-sensitizing coagulant which comprises a silicone compound.

6. The method of claim 1 wherein the cross-linking agent is a melamine-formaldehyde resin.

7. The method of claim 1 wherein the latex composition comprises a minor amount of a thermoplastic polymer to modify the hand properties of the cross-linked coagulated polymer.

8. The method of claim 1 wherein the latex polymer comprises an elastomeric polyurethane polymer.

9. The method of claim 1 wherein the latex composition comprises a combination of an elastomeric, cross-linkable, polyurethane polymer and a cross-linkable, carboxylated, acrylonitrile-butadiene polymer, and wherein the cross-linking agent is a melamine-formaldehyde resin.

10. The method of claim 1 wherein the latex composition includes from about 5% to 30% by weight of the composition of a vinyl-halide polymer.

11. The method of claim 1 wherein the heat-coagulated, dry foam layer has a dry foam density of greater than about 50 pounds per cubic foot.

12. The method of claim 1 wherein the fibrous base sheet comprises a nap fabric sheet, wherein the nap fabric side of the sheet is placed in contact with the wet foam layer, and wherein the sheet material comprises a thin, elastomeric urethane resin or a vinyl-halide resin on a release paper, and which method includes the step of stripping the release paper from the resin layer, to provide an imitation-leather sheet laminate material.

13. The method of claim 1 wherein the dry heat-coagulated foam layer has a thickness of from about 5 to 50 mils.

14. The method of claim 1 wherein the sheet material comprises a release paper, and which includes the step of stripping the release paper from the dry foam layer of the dry laminate product, to provide an imitation-leather sheet material which comprises the dry heat-coagulated polymer as a dry layer bonded to the fibrous base sheet material.

15. The method of claim 1 wherein the latex composition has a pH of less than 4.0 and includes a small amount of a paratoluene sulfonic acid, and wherein shock-heating of the wet laminate product is carried out at a temperature of from 250° F. to 300° F.

16. The product produced by the method of claim 1.

17. The product produced by the method of claim 9.

18. The product produced by the method of claim 11.

19. The product produced by the method of claim 1 wherein the sheet material is stripped from the dry laminate product, to provide an imitation-leather sheet material.

20. In a method of preparing an imitation-leather laminate sheet material, which method comprises: coating a thin, wet, foam layer of from about 5 to 100 mils of a foamed latex composition, comprising a cross-linkable, elastomeric polyurethane polymer onto a thin, top, flexible, skin layer of a urethane resin or vinyl-chloride resin on a release material, the latex composition containing a melamine-formaldehyde resin, cross-linking agent for the polymer; placing a napped fabric sheet material onto the top surface of the wet foam layer, the napped surface down and in contact with the wet foam layer, to provide a wet laminate product; and heating the wet laminate product to dry and cure the foam layer; and, thereafter, removing the release material from the urethane resin or vinyl-chloride resin layer to provide an imitation-leather substitute material, the improvement which comprises:
    (a) providing the heat-coagulable, polyurethane polymer composition which has a pH of from about 2.0 to 5.0 and which contains paratoluene sulfonic acid, to provide a heat-coagulated polymer having a coagulation temperature of from about 125° F. or less; and
    (b) shock-heating the wet foam layer of the wet laminate product by heating rapidly the wet foam layer in a single heating operation in an oven to a temperature of from about 250° F. to 350° F. to heat-coagulate the polymer into a fine, dense, open-cell, foam structure, the foam having a dry density of greater than about 50 pounds per cubic foot, to remove water from the coagulated foam layer and to cross-link the polymer.

21. The laminate product produced by the method of claim 20.

* * * * *